United States Patent [19]

van der Lely

[11] 4,331,342
[45] May 25, 1982

[54] TANK WAGON

[76] Inventor: Cornelis van der Lely, 7 Brüschenrain, Zug, Switzerland

[21] Appl. No.: 146,653

[22] Filed: May 5, 1980

[30] Foreign Application Priority Data

May 8, 1979 [NL] Netherlands .......................... 7903573

[51] Int. Cl.³ .............................................. B60P 3/24
[52] U.S. Cl. .................................... 280/5 C; 137/520; 137/576
[58] Field of Search ............... 280/5 C, 5 E, 5 F, 5 R; 220/22; 137/520, 576

[56] References Cited

U.S. PATENT DOCUMENTS

| 2,558,168 | 6/1951 | Bernstein | 280/5 C |
| 2,678,660 | 5/1954 | Gurin | 137/576 |
| 2,703,607 | 3/1955 | Simmonds | 137/576 |
| 3,050,315 | 8/1962 | Kindler et al. | 280/5 R |

FOREIGN PATENT DOCUMENTS 133768  12/1959  U.S.S.R. .............................. 280/5 C

Primary Examiner—Joseph F. Peters, Jr.
Assistant Examiner—Donn McGiehan
Attorney, Agent, or Firm—William B. Mason

[57] ABSTRACT

A tank wagon for liquid material has interior partitions with dampeners to counteract movement and kenetic energy of the material with respect to the tank in one direction only. In this way, energy can be withdrawn from the liquid material movement during braking for instance, to mitigate adverse effects of such movement. In the embodiment detailed, partitions having openings are closed by hinged flaps during braking. Normally the flaps are gravity-urged to an open position. The tank can be composed of two compartments with different cross sections and length so that a lower and smaller compartment is located directly above a set of wheels. The larger compartment is contiguous with the upper part of the smaller compartment and is angled upwardly and forwardly. Thus, the lowermost portion of the larger compartment can be at the approximate level of the wheel axes.

20 Claims, 3 Drawing Figures

U.S. Patent
May 25, 1982
4,331,342
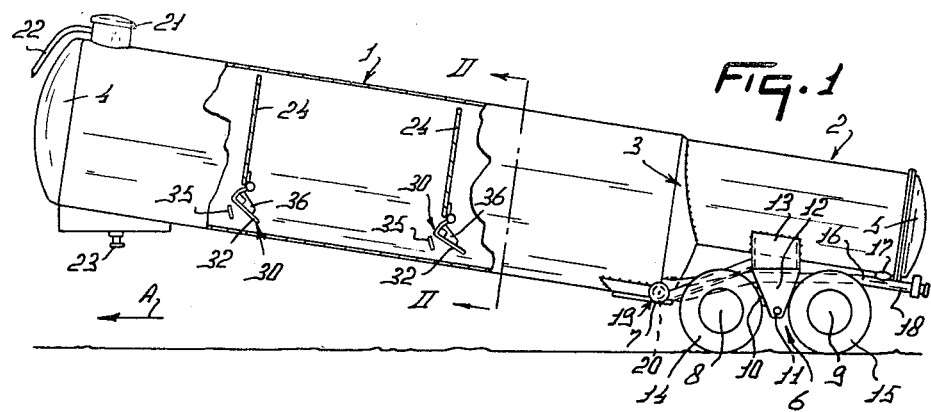
Fig. 1
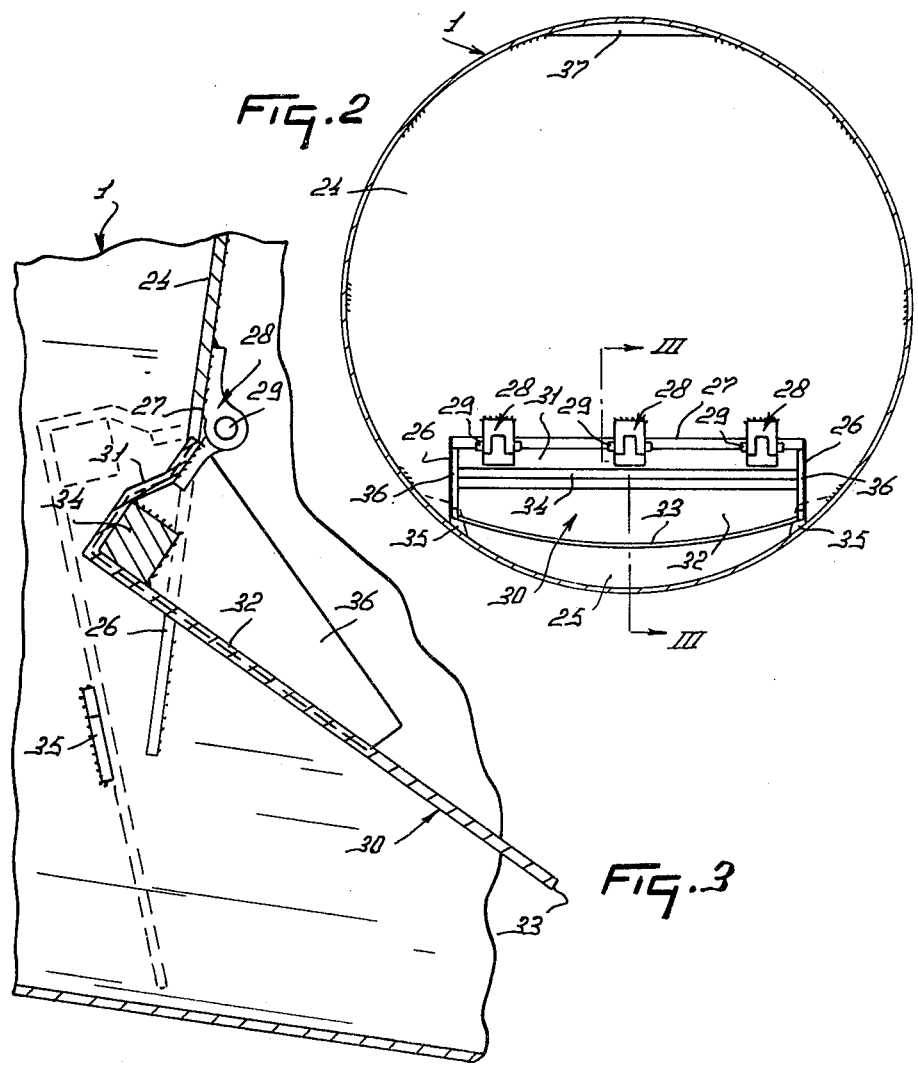
Fig. 2
Fig. 3

TANK WAGON

This invention relates to tank wagons for transporting liquid material. Hereinafter where reference is made to 37 front", "rear" and so on, this is with respect to the intended direction of forward movement of the wagon over the ground.

Tank wagons can be used to transport large amounts of material, by which is meant quantities of 20,000 to 25,000 liters and more so that in transporting fluids of high specific weight (which may even exceed 5) very large masses are accelerated and decelerated. Furthermore, with respect to the term "liquid", it should be noted that this term also includes very thick-liquid fluids (such barytes). Such fluids may be mixtures of light- and heavy-weight components, which mixtures may dissociate. After the tank wagon is filled, the heavier parts of the fluid may sink down and collect on the bottom of the tank, the lighter parts of the fluid then being located in the upper part of the tank. When during transport the moving tank wagon has to be decelerated, braking is likely to be followed by a thrust of the fluid mass against the front end of the tank, particularly when the tank is partly filled, this thrust occurring a short time after the initiation of the braking operation. If the fluid is a non-homogeneous mass and the heavier parts have sunk to the bottom of the tank, these heavier parts will behave with respect to the upper lighter parts, when the tank wagon is braked, in a manner such that they move forwards with respect to the side wall of the tank, abut against the front wall of the tank and urge the upper lighter parts back so that a whirl is produced in the tank. This forward movement of the dissociated heavier mass located on the bottom also has the result in the case of a full tank, that after the initiation of the deceleration of the tank wagon a mass thrust occurs some time later as a result of the forward shift of the heavier parts of the mass. Such thrust can result in the tank wagon breaking away from a towing tractor and rolling over.

According to the present invention there is provided a tank wagon comprising a tank for transporting liquid material, the tank comprising means arranged to counteract movement of the material with respect to the tank in one direction and to pass the material in the opposite direction. In this way energy can be withdrawn from the fluid movement produced under braking thereby to mitigate the adverse effects discussed above.

For a better understanding of the invention and to show how the same may be carried to effect, reference will now be made, by way of example, to the accompanying drawing, in which:

FIG. 1 is a side view of a tank wagon in the form of a semi-trailer, part of the wagon being shown in a vertical sectional view, FIG. 2 is a sectional view taken on line II—II in FIG. 1, and FIG. 3 is a sectional view taken on the lines III—III in FIG. 2.

The tank wagon illustrated in the Figures is intended for road transport and in the embodiment illustrated is a semi-trailer. It could however, be a trailer truck or a self-propelled vehicle. The useful space inside the wagon for the transport of material is mainly bounded by the walls of two tank compartments formed by hollow sheet steel cylinders 1 and 2, which are interconnected by means of a transitional part 3, in a liquid-tight manner, such that the spaces inside the cylinders 1 and 2 communicate with one another.

The cylinder 1 which is the front cylinder with respect to the intended direction of forward travel A has in the particular form illustrated a length of about 7.2 ms and a diameter of about 1.94 ms, whereas the cylinder 2 which is smaller and is located behind the cylinder 1 has a length of about 2.6 ms and a diameter of about 1.22 ms, these dimensions being given by way of example only. The overall capacity of the wagon consists of the capacities of the cylinders 1 and 2, the contents of the transitional part 3 located between the cylinders 1 and 2 (this proportion of the total being comparatively small) and the contents of the spaces bounded by a cover 4 at the front end of the cylinder 1 and by a cover 5 at the rear end of the cylinder 2, both these covers 4 and 5 being hemi-spherical.

The center lines of the cylinders 1 and 2 are parallel to one another and are both at an angle of about 8° to a horizontal plane. The front end of the rear cylinder 2 is fastened by means of the transitional part 3 to the rear end of the front cylinder 1 in a manner such that the upper generatrices of the cylinders 1 and 2 are substantially in line with one another, while the vertical plane passing through the upper generatrix of the cylinder 1 and the center line of the cylinder 1 coincides with the vertical plane passing through the upper generatrix of the cylinder 2 and the center line of the cylinder 2. The front ends of the cylinders 1 and 2 are located at a higher level that the respective rear ends.

The transitional part 3 is composed of a steel sheet having the shape of part of a sphere (similar to the covers 4 and 5), which is bounded by the line of intersection of this part-sperical part and the cylinder 2. The length of the transitional part 3 measured in a direction parallel to the center line of the cylinder 1 or 2 near the upper generatrix of the cylinders 1 and 2 is comparatively small and amounts to about 2% of the length of the cylinder 2.

Since the upper generatrices of the cylinders 1 and 2 are substantially in line with one another and the diameter of the cylinder 1 is markedly larger than that of the cylinder 2, a space is formed behind the transitional part 3 and beneath the cylinder 2, in which a wheel set 6, in this case a semi-trailer wheel set, is disposed at least in part. Therefore, the lowermost point of the entire space within the wagon (also the lowermost point of the cylinder 1, designated by reference numeral 7) is located in front of the wheel set 6 and approximately at the level of the horizontal plane passing through the axles 8 and 9 of the wheel set. With respect to the direction of travel A the wheel axles 9 and 8 are located one behind and parallel to the other and are supported by a wheel frame 10, which is fastened to supports 12 located one on each side of the cylinder 2 so as to be freely pivotable about a horizontal pivot shaft 11 extending transversely of the direction of travel A, these supports 12 being rigidly secured to the cylinder 2 by means of upwardly extending steel sheets 13, which directly support the cylinder 2 and are directed vertically or tangentially to the cylinder 2. The pivot shaft 11 is located substantially midway between the wheel axles 8 and 9.

On each side of the vehicle each wheel axle 8 and 9 respectively is provided with tired ground wheels 14 and 15 respectively. Between the top of the wheel set 10 and the bottom of the cylinder 2 and also between the inner sides of the sets of wheels 14 and 15 respectively there is a space in which a tube 16 is disposed. The tube 16 communicates at the front, or can be connected there, with the interior of the cylinder 1 at the zone designated by reference numeral 7, whereas near its rear end (reference numeral 17) the tube 16 communicates with, or can be connected to, the interior of the cylinder 2, the connection at 17 being downwardly and laterally inclined and located at the lowermost point of the cylinder 2, hence near the bottom rear end thereof. Viewed in plan, the tube 16 may be located near the center lines of the cylinders 1 and 2, but the rear end 18 of the tube 16 is bent over towards one side of the wagon (FIG. 4). Near its front the tube 16 communicates with a lateral tube 19 directed at right angles to the direction of travel A (FIG. 3), which has an opening 20 extending substantially at right angles to the direction of travel A. Viewed from the side, the lateral tube 19 and its opening 20 are located at the lowermost point 7 of the cylinder 1. The tube 16 serves as an intake tube for liquids to be introduced into the cylinders 1 and 2, and as an evacuation tube for liquids to be conducted away from the cylinders 1 and 2.

At the front on top the tank wagon is provided with a connecting piece 21 through which the cylinders 1 and 2 can be exhausted or subjected to excess pressure. For this purpose the connecting piece 21 is provided with an intake-compressing tube 22 which can be connected with an exhaust or compression system (not shown) which may be provided on the tank wagon itself or on a tractor hauling the wagon or which may be a stationary system. On the bottom and front of the cylinder 1 a pin 23 is provided for coupling the tank wagon with the fifth wheel of a tractor.

The cylinder 1 and, if desired, also the cylinder 2, is provided with relatively spaced internal partitions 24 having a circular outer circumference substantially throughout the length and being in engagement with the wall of the cylinder 1. Each partition 24 extends at right angles to the center line of the cylinder concerned (FIG. 2). Near the bottom of each of the partitions 24, the partition defines edges of an opening 25, which is symmetrical to a vertical plane passing through the center line of the cylinder concerned. On the bottom this opening 25 is bounded by the wall of the cylinder concerned and is bounded on its sides by vertical boundary lines 26 of the material of the partition 24 and at the top by a horizontal boundary line 27 of the partition 24 joining the tops of the boundary lines 26 (FIG. 2). In a direction of height the opening 25 has a dimension equal to about 20 to 30%, preferably about 25%, of the diameter of the partition 24. The distance between the vertical boundary lines 26 of the opening is 50 70% of the diameter of the partition 24, preferably about 60% of this diameter. It will be understood that the opening 25 joins the lower part of the wall of the cylinder concerned.

Along the boundary line 27 of the opening 25 three hinges 28 are provided, the hinge shafts 29 of which are in line with one another and are at right angles to the vertical plane of symmetry of the cylinder concerned. The upper halves of the three hinges 28 are fastened near the upper boundary of the opening 25 to the rear of the partition 24 whereas to the lower halves of the hinges 28 is secured a flap 30, which is freely pivotable about the three hinge shafts 29.

In a sectional view (FIG. 3) each flap 30 consists of a curved steel sheet extending away from the hinges 28 in downward and/or forward direction initially through a flap portion 31 which is bent over at a distance from the hinge shaft 29 through about 90° to merge with a flap portion 32. This portion 32 is preferably flat and extends up to a boundary line 33 of the flap portion 32 and of the whole flap 30. The boundary line 33 has a shape such that it is located in a plane passing through the hinge shafts 29 and viewed in the last-mentioned plane this boundary line forms part of the arc of a circle having a radius substantially equal to that of the circular partition 24. In the angle between the flap portions 31 and 32 a ballast weight 34 is provided, formed by a solid rod covering the whole width of the flap portion 32 between the boundary lines of the portion 32.

Near the two junctions between the boundary lines 26 of the partition 24 and the lower part of the tank wall the opening 25 is closed for a very small part by two stops 35 (FIG. 2), which are directed at right angles to the center line of the cylinder 1. The stops 35, formed by steel sheet parts, serve as stops for the flap 30 (see also FIG. 3). When the flap portion 32 is in contact with the stops 35, the boundary line 33 of the flap 30 is substantially in contact with the lower part of the wall of the cylinder 1 and is respectively located so that a narrow gap is left between the boundary line 33 and the lower part of the tank wall (FIG. 3).

From FIG. 3 it will be apparent that at both lateral ends of the flap 30, that is to say, near the two boundary lines 26 of the opening 25, the flap 30 is provided with a side partition 36. Each of the two side partitions 36 closes the corner between the flap portions 31 and 32 and, viewed in a direction at right angles to the vertical plane of symmetry of the cylinder 1, it has such a boundary that, when the flap 30 engages the stops 35, the two side partitions 36 close the openings between, on the one hand, the flap portions 31 and 32 and, on the other hand, the parts of the partition 24 located near the boundary line 26.

The ballast weight 34 is located at such a distance beneath the center lines of the hinge shafts 29, and it has such a weight as compared with the weight of the portions 31 and 32, that if only gravity is operative on the flap 30 it takes up the position indicated by solid lines in FIG. 3. In this position the flap portion 32 is located at a distance behind the stops 35 and an opening shown in FIG. 2 is left between the boundary line 33 and the lower part of the wall of the cylinder 1.

In transporting large quantities of liquids there is the problem that the center of gravity of the overall mass of tank wagon and the material transported tends to be located too high above the road with regard to risks of accidents in transporting such large masses at a comparatively high speed. Especially during braking operations at bends there is a great risk of the tank wagon breaking away from the tractor hauling it or, in the case of a self-propelled wagon, of the wagon rolling over due to the inertia of the large mass located at a distance above the road. The nature of the materials that can be transported, and the problems arising therewith, have been discussed above. With regard to such problems, the tank wagon herein described has two cylindrical tank compartments of which the compartment of the larger diameter and length is located in front of the wheel set and bears at the front on the tractor hauling the wagon. The other tank compartment is disposed above the wheel set and directly bears thereon. Since the upper generatrices of the two tank compartments are substantially in line with one another and the diameter of the front tank compartment exceeds that of the rear tank compartment, the rear and bottom of the front tank compartment are located in front of the wheel set in a manner such that the lowermost point of this tank compartment is substantially located in the horizontal plane passing through the wheel axles of the wheel set. It is thus achieved that a comparatively large part of the bulk of the tank wagon and of the material to be transported is located at a comparatively low level, particularly in a space which is generally not utilised as a load carrying space in known constructions. Moreover, the center lines of the two tank compartments are inclined forward and upwards at an angle of about 8°. During transport the comparatively heavy parts of the fluid being transported seek the bottoms of the two tank compartments and collect in the lower rear space of each, owing to their inclined positions, so that these heavy parts accumulate near the outlet ports in the area of communication between the front tank compartment and the tube 16 and the side tube 19, and between the connection 17 to the tube 16 from the rear tank compartment. Owing to its inclined position, the contents of the front tank compartment can directly flow away under pressure via the opening 20 near the lowermost point 7 and the dissociated mass near the bottom and rear of the rear tank compartment can flow away through the connection 17 and the rear end 18 and also through the tube 16 to the front towards the side tube 19 and the outlet port 20. In this way the dissociation of the fluid is utilised since the heavier parts are first conducted away and the tank compartment concerned is flushed by the lighter parts, to which contribute the positions of the two tank compartments and the relative dispositions and shapes of the two tank compartments as described above.

It has also been mentioned above that when, during transport, the moving tank wagon has to be decelerated, braking is likely to be followed by a thrust of the fluid mass against the front end of the tank, particularly when the tank is partly filled, this thrust occurring a short time after the initiation of the braking operation; and that if the fluid is a non-homogeneous mass and the heavier parts have sunk to the bottom of the tank, these heavier parts will behave with respect to the upper lighter parts, when the tank wagon is braked, in a manner such that they move forwards with respect to the side wall of the tank, abut against the front wall of the tank, and urge the upper lighter parts back so that a whirl is produced in the tank. It has been indicated already that this forward movement of the dissociated heavier mass located on the bottom also has the result, in the case of a full tank, that after the initiation of the deceleration of the tank wagon a mass thrust occurs some time later as a result of this forward shift of the heavier parts of the mass; and that such thrust can result in the tank wagon breaking away from a towing tractor. In the present wagon, however, the inclined position of the tank, in which the center line of the cylinders 1 and 2 are inclined upwards in the forward direction, results in that the heavier parts lying on the bottom have first to shift upwards so that part of the kinetic energy of these heavier parts is converted into potential energy, while the inclined position of the tank considerably contributes to the avoidance of the aforesaid thrusts of the bulk. Moreover, the contents of one or more tank compartments, in this embodiment the tank compartment formed by the cylinder 1, are divided by the partitions 24. By thus reducing the spaces in which the fluid is freely movable, it is achieved that the relative velocity of the fluid parts with respect to the tank remain low so that the thrust of the mass is mitigated.

The disposition and shape of the flaps 30 in the partitions 24 described above ensure that the flaps 30 automatically close when, after braking of the tank wagon, the lower parts of the fluid tend to shift forwards. The flaps 30 are shut, by the fluid or the heavier parts of the fluid moving towards the openings 25, into a position indicated in FIG. 3 by broken lines. This position is defined, for each flap, by contact between the flap portion 32 and the relevant stops 35. The fluid parts near the bottom of the tank are thus prevented from gaining speed with respect to the tank wall and from shifting to the front so that the aforesaid thrust of the mass is avoided. Even if no fluid is contained in the tank the flaps 30 will shut when the tank wagon is braked. In normal drive of the tank wagon, and during standstill of the tank wagon, the flaps 30 are open under the action of the weight 34 so that they do not hinder emptying of the tank.

By means of the intake and compression tube 22, which communicates with the cylinders 1, 2 through the connecting part 21, subatmospheric pressure can be produced in the tank so that the tank can be filled through the tube 19 and/or the tube 16. Via the tube 22 excess pressure can be produced in the tank for emptying the tank through the tube 19 and/or the tube 16, in which case the precipitated heavy parts of the fluid will first leave the tank.

It is furthermore to be noted that each of the partitions 24 is in engagement along substantially the whole edge of its upper half, along substantially the whole length of this edge, with the cylindrical tank wall. Each partition 24 is welded to the tank wall and between two neighbouring welds there is a non-welded length equal to substantially the length of each of the neighbouring welds. At the upper part of the partition 24 a small gap 37 is formed between the tank wall and the partition by means of which energy can be withdrawn from the fluid movement produced by braking the tank wagon owing to the damping of the fluid in the gap. Such a damping of the fluid during deceleration of the tank wagon may also be obtained by the gap between the boundary line 33 of the flap 30 and the lower part of the tank wall.

While various features of the tank wagons that have been described, and that are illustrated in the drawings, will be set forth in the following claims as inventive features, it is to be noted that the invention is not necessarily limited to these features and that it encompasses all of the features that have been described both individually and in various combinations.

I claim:

1. A tank wagon comprising a frame movable over the ground and a tank for transporting liquid material being mounted on said frame, partition means in said tank that divides material in the tank into portions, said partition means having a lower opening and flap means positioned to at least partly close the opening during deceleration of the wagon's forward travel to dampen the flow of material in the tank in only one direction, said flap means being hinged to the remainder of said partition means and pivotable about a horizontal pivot axis that extends transverse to the direction of wagon travel, said pivot axis being located above the flap means said flap means being freely pivotably about the pivot axis when the tank is empty, the center of gravity of the flap means being located below said pivot axis and said flap means normally being pivoted by gravity at least partly open to expose the opening during the acceleration or the rest position of said wagon and allow liquid to flow from one side of the partition to the other.

2. A tank wagon as claimed in claim 1, wherein said flap means is a flap that comprises weighted means normally biasing the flap to an open position so that liquid can pass through said opening.

3. A tank wagon as claimed in claim 2, wherein a major part of said flap is planar and extends at a right angle to a vertical plane of symmetry of said tank in the direction of wagon travel.

4. A tank wagon as claimed in claim 3, wherein an upper portion of said flap is bent about 90° from the major part thereof.

5. A tank wagon as claimed in claim 4, wherein a ballast weight is secured to the flap between said pivot axis and the lower flap end.

6. A tank wagon as claimed in claim 5, wherein said weight is located adjacent a bend between said major part and upper flat portion.

7. A tank wagon as claimed in claim 6, wherein said weight comprises a solid rod that extends parallel to said pivotal axis and across the entire width of said flap.

8. A tank wagon as claimed in claim 7, wherein the major part of said flap in a no-load state extends upwards and forwards away from the lower edge thereof.

9. A tank wagon as claimed in claim 4, wherein said major part is located adjacent the bottom of the tank interior.

10. A tank wagon as claimed in claim 9, wherein at least a part of the lower end of said major part substantially engages the lower tank wall during load.

11. A tank wagon as claimed in claim 9, wherein flap sidewalls extend substantially at right angles to said major part.

12. A tank wagon as claimed in claim 11, wherein at least one stop is located in front of the flap with respect to normal direction of forward travel to engage the flap in its loaded condition, the lower end of said major part extending substantially along the tank bottom wall when the flap is in contact with said stop.

13. A tank wagon as claimed in claim 3, wherein at least one gap is located between the upper edge of said partition and the tank interior wall.

14. A tank wagon comprising a frame movable over the ground and a tank for transporting liquid material being mounted on said frame, partition means in said tank that divides material in the tank into portions, said partition means having a lower opening and a flap positioned to at least partly close the opening during deceleration of the wagon's forward travel to dampen the flow of material in the tank in only one direction, said flap being hinged to the remainder of said partition means pivotable about a horizontal pivot axis that extends transverse to the direction of wagon travel, said pivot axis being located above the flap and said flap being freely pivotable about the pivot axis when the tank is empty, the center of gravity of the flap being located below said pivot axis and said flap being configured whereby the flap is pivoted by gravity at least partly open to expose the opening during the acceleration or the rest position of said wagon and allow liquid to flow from one side of the partition to the other.

15. A tank wagon as claimed in claim 14, wherein a lower part of said flap extends rearwardly from an upper flap portion and with respect to the wagon's normal direction of forward travel, stop means in said tank located in front of the opening and positioned to engage said lower part when the flap is pivoted forwardly during deceleration.

16. A tank wagon as claimed in claim 15, wherein said tank is cylindrical with a longitudinal axis extending in the direction of travel, forwardly and upwardly from the rear of the wagon.

17. A tank wagon as claimed in claim 16, wherein said tank comprises two compartments of different diameters, said compartments being generally in line with one another and the front compartment being larger in diameter than the rear compartment, support means positioned beneath said rear compartment.

18. A tank wagon as claimed in claim 15, wherein the longitudinal axis of said tank is forwardly and upwardly from the rear of said wagon.

19. A tank wagon as claimed in claim 18, wherein the longitudinal axis of said tank is inclined at an angle of about 8° to the horizontal.

20. An elongated tank for transporting liquid material including at least one internal upwardly extending partition that divides material in the tank into two portions, said partition comprising a flap that dampens the flow of material in the tank in only one direction, said partition having an opening and said flap being pivoted to an adjacent portion of the partition to freely pivot about a generally horizontal axis and more or less close said opening, said flap comprising an upper part that is located adjacent the partition portion and a lower portion that extends towards one tank end, ballast supported on said flap above the lower edge of said flap, the center of gravity of said flap being located to pivot the flap to a neutral position and expose said opening, whereby liquid material can flow through the opening from one portion to the other portion, towards the opposite tank end, stop means in said other tank portion, adjacent said opening, said stop means being positioned to arrest the pivoting of the flap towards said opposite end before said opening is completely closed by the flap during liquid material surge towards said opposite end.

* * * * *